June 28, 1966  D. W. KERST  3,258,401
FUSION-RESEARCH APPARATUS
Filed July 23, 1962  2 Sheets-Sheet 1

Inventor
DONALD W KERST
By Hoars, Anderson, Luedeka & Fitch
Attys

June 28, 1966    D. W. KERST    3,258,401
FUSION-RESEARCH APPARATUS
Filed July 23, 1962    2 Sheets-Sheet 2
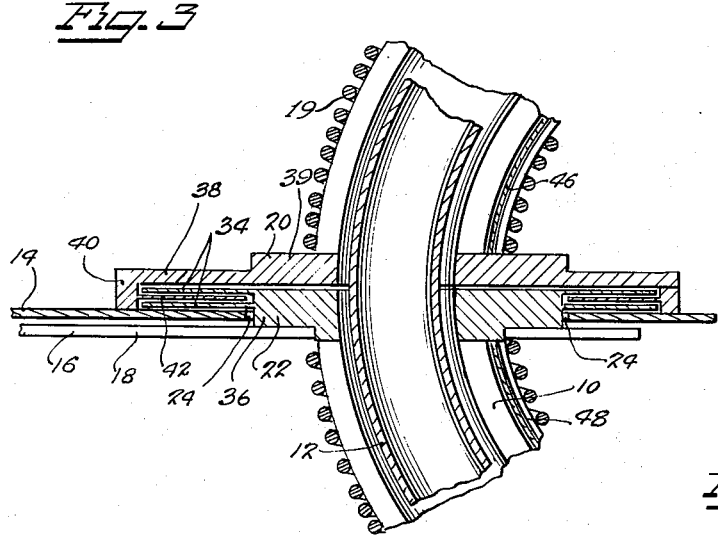
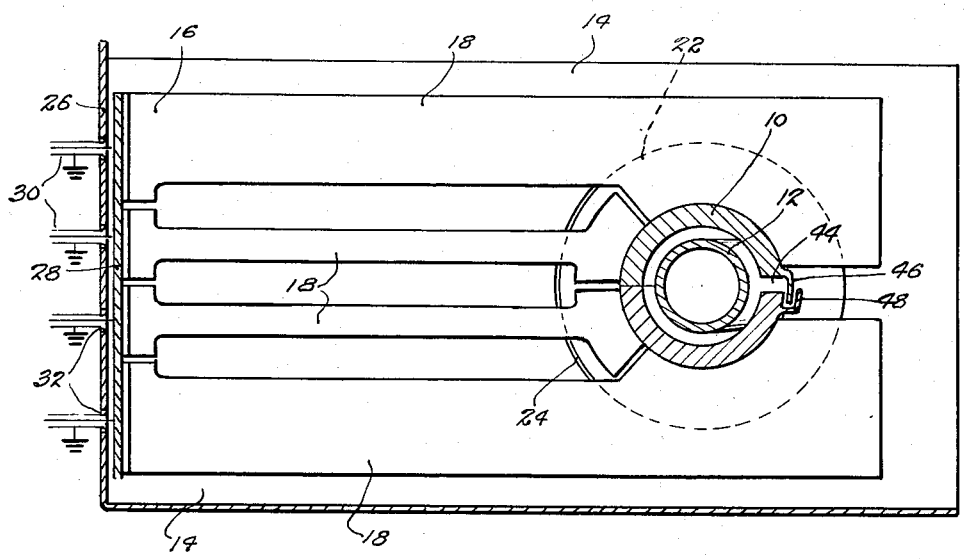
Inventor
DONALD W KERST

United States Patent Office 3,258,401
Patented June 28, 1966

3,258,401
FUSION-RESEARCH APPARATUS
Donald W. Kerst, Madison, Wis., assignor to General Dynamics Corporation, New York, N.Y., a corporation of Delaware
Filed July 23, 1962, Ser. No. 211,683
7 Claims. (Cl. 176—1)

The present invention relates to a fusion-research apparatus and more particularly to an improved apparatus for heating and confining particles for such research.

Fusion-research apparatus have commonly been built in the form of endless tubes of either toroidal or racetrack form, in order to eliminate electrodes and electrode cooling problems. One such apparatus is shown and claimed in Patent Number 2,976,444, which is assigned to the asignee of this invention. In this apparatus, a plurality of tubular conductive members are disposed sequentially along a toroidal containment vessel. The ends of the tubular members are connected through parallel plates to a source of high voltage in the form of a capacitor bank.

Because of its toroidal shape, the fusion research device has a higher flux density passing through the center hole than around the outside thereof. This causes the current which flows on the exterior surface of the conductive members to be non-uniform. The surface current density on the inside of the torus, the side nearest the major axis of the torus, may be as much as 10 times the surface current density on the outside thereof. Since the current to the conductive members is fed from the outside of the toroidal apparatus, a major portion of the current must flow across the gap between the ends of the conductive members to feed the inner surface of the conductive members. This current causes transverse magnetic fields at the gap between the ends of the conductive members. These spurious transverse magnetic fields tend to reduce the stabilizing effect of the magnetic field set up by current flowing through the conductive members on the plasma within the containment vessel. Such fields may excite instabilities in the confined plasma.

An object of the present invention is the provision of an improved apparatus for confining and heating charged particles. Another object is the provision of a toroidal fusion research apparatus which is provided with improved means for supplying current thereto. A further object is the provision of a toroidal fusion research apparatus in which transverse magnetic fields in the region of the plasma are minimized. Still a further object is the provision of an improved fusion research apparatus which is relatively compact and inexpensive to construct.

Other objects and advantages of the present invention will become apparent by reference to the following description and accompanying drawings.

In the drawings:

FIGURE 3 is an enlarged diagrammatic view of a portion of FIGURE 2; and

FIGURE 4 is an enlarged diagrammatic cross sectional view taken along line 4—4 of FIGURE 2.

Figure 1:
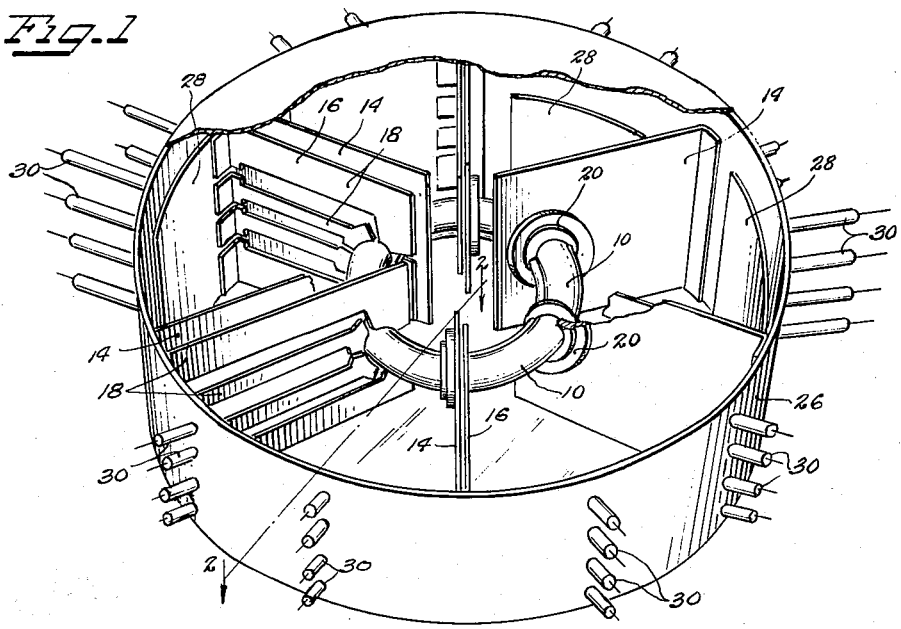
FIGURE 1 is a diagrammatic perspective view of a toroidal fusion research apparatus in accordance with the present invention with a portion thereof broken away to show the internal construction thereof.

As shown in the drawings, the fusion research apparatus generally includes a plurality of generally tubular members 10 extending about and sequentially disposed along an endless tubular containment vessel 12. Each of the tubular members 10 is grounded by one of a plurality of return transmission plates 14 which are connected to coresponding ends of the tubular members 10. The other end of each of the tubular members 10 is connected to one of a plurality of supply transmission plates 16. Each of the supply transmission plates 16 includes a plurality of spaced apart, conductive strips 18 extending from the supply connection to the tubular member associated with that transmission plate, the conductive strips 18 being connected to the periphery of the tubular member 10 at separate areas along the periphery. The conductive strips 18 are sized and spaced apart so that each strip forms an inductance that distributes the current to the associated tubular member in accordance with the current requirements of the separate areas of the tubular member 10 whereby transverse fields at the gaps between the tubular members 10 are minimized.

More specifically, the fusion research device includes the toroidal discharge tube or containment vessel 12 which is made of a suitable high temperature material, such as ceramic. The containment vessel 12 is provided with a radially extending conduit (not shown) which is connected to suitable means for filling the discharge tube with a desired gaseous material and for maintaining the tube at a desired pressure.

Disposed sequentially about the discharge tube are the plurality of generally tubular segments or members 10 which are formed of conductive material, such as copper or the like. Return and supply flanges 20 and 22 are provided at each end of the respective tubular segments 10. The discharge tube 12 is supported in any suitable manner, such as by insulating spacers (not shown) within the segments 10. Also, a helical winding 19 is disposed about the discharge tube 12, which winding serves to produce an axial, stabilizing magnetic field in the discharge tube in the conventional manner.

Ground connections are provided for the segments 10 by the return transmission plates 14 which are generally rectangular and are made of a conductive material such as copper. The return transmission plates 14 are vertically disposed and extend generally radially relative to the discharge tube 12. Each of the return transmission plates 14 is provided with a generally circular aperture 24 for receiving the discharge tube 12. One each of the return transmission plates 14 is connected to the return flange 20 of the segment 10, as hereinafter described.

The toroidal discharge tube 12, the segments 10 and the return plates 14 are disposed within a shield 26 in the form of a flat cylindrical can of conductive material, such as copper. The return plates 14 are suitably joined to the side wall of the shield 26 and may also be joined to the bottom of the shield 26 so as to provide a support for the segments 10.

In the illustrated embodiment, the supply flange 22 at the other end of each of the segments is connected, as hereinafter described, to the supply transmission plates 16 which are made of a conductive material, such as copper. Each of the supply plates 16 extends from the associated tubular segment 10 to the side wall of the shield 26 in parallel relation to the adjacent return transmission plate 14. The outer end of each of the supply transmission plates 16 is suitably connected to an arcuate plate 28 of conductive material which extends in parallel relation to the side wall of the shield 26 and in spaced relation thereto. Suitable insulation (not shown) is provided between the transmission plates 14 and 16 and between the arcuate plate 28 and the shield 26.

Power is supplied to each arcuate plate 28 by a plurality of coaxial cables 30 which extend through apertures 32 in the side wall of the shield 26. The inner conductors of the coaxial cables 30 are connected to the arcuate plate 28 while the outer conductors thereof are connected to the side wall of the shield 26, thereby grounding the shield. The coaxial cables 30 are, in turn, connected to a source of high voltage (not shown) such as a capacitor bank.

When a pulse of current is applied to the coaxial cables 30 and, in turn, to each of the tubular segments 10, a current flows longitudinally of the tubular segments 10 from the supply transmission plates 16 to the return transmission plates 14. The toroidal geometry of the tubular segments 10 requires that the surface current density on each of the segments 10 be non-uniform. In this connection, the surface current density nearest the major axis is much greater than the surface current density away from the major axis of the torus.

To supply this non-uniform current flow, each supply transmission plate 16 is constructed so that current flows to the tubular segment 10 from the outside edge of the supply flange 22 and so that no current flows across the flange 22. This is accomplished in the illustrated embodiment by employing a plurality of trimmed transmission lines for the supply plate 16. In this connection, each supply plate 16 includes the plurality of vertically disposed spaced apart strips 18 which extend from the arcuate plate 28 to the supply flange 22 of the tubular segment 10. The innermost ends of the tubular strips 18 are suitably joined to separate areas of the rearward side of the flange 22.

In the illustrated embodiment, four parallel strips 18 are provided, the two centermost strips being connected to the flange 22 at areas disposed away from the major axis of the torus and the two outermost strips being connected to the flange 22 at areas near the major axis. The strips 18 are made of such a height and are spaced at such a vertical distance relative to each other that the inductance of each of the two innermost strips is less than the inductance of each of the two outermost strips. In this connection, the relative inductance of each innermost strip is trimmed relative to that of each outermost strip so that the required amount of current flows in the outermost strips. For example, if the surface current density that is required in the innermost surface of the toroidal segment 10 is approximately 4½ times the current required on the outermost surface of the toroidal segment, the total inductance of the two strips feeding the innermost surface is made much less than the total inductance of the strips feeding the outermost surface.

Once a discharge is initiated in the plasma within the containment vessel 12, the moving plasma induces image currents on the interior surface of the tubular segments 10. If the plasma is approximately on the minor axis of the torus, the current density on the interior surface of the tubular segments 10 is approximately uniform. The currents flow out through the supply flange 22 of the segment and return through the external circuit to the return flange 20 of that segment. In order to prevent perturbations in the plasma, the current must emerge from the flange 22 concentrated near the major axis of the torus with the distribution characteristic of the exterior magnetizing currents in order to match the trimmed transmission plates 16.

Figure 2:
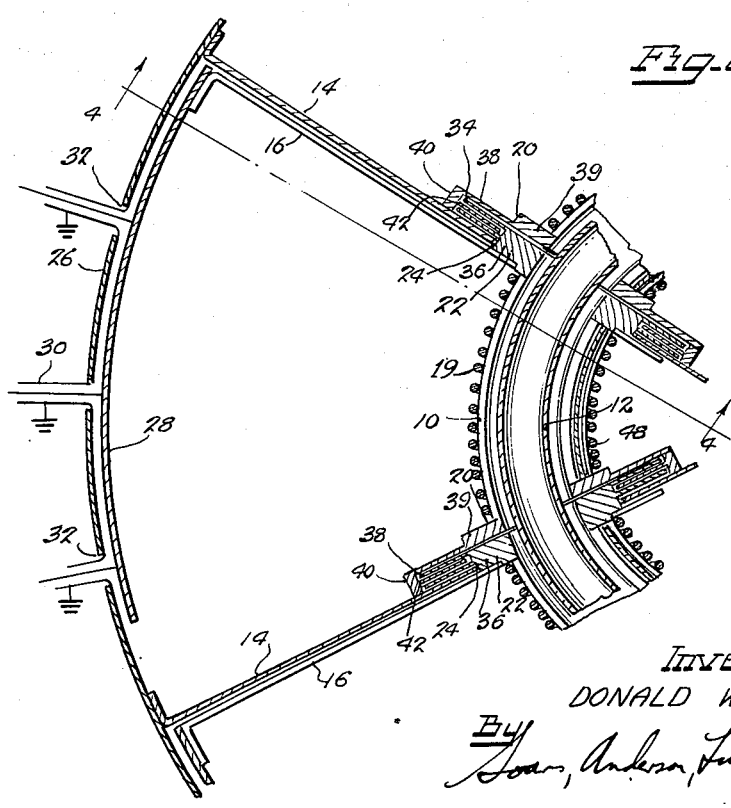
FIGURE 2 is an enlarged, fragmentary diagrammatic cross sectional view taken along line 2—2 of FIGURE 1.

To reduce the transverse field created by the re-distribution of the image currents, the flanges 20 and 22 are constructed as shown in FIGURES 2 and 3. In this connection, the effective outer radius of each supply flange 22 is made very large compared with the radius of the tubular segment 10. The supply flange 22 is doubly folded in order to reduce the area required for the flange.

As shown particularly in FIGURE 3, the supply flange 22 includes a pair of spaced apart circular plates 34 which extend radially outwardly from an inner or body portion 36 of the flange. The transmisison strips 18 are suitably joined to the rearward side of the body portion 36 in spaced relation to the circular plates 34. The return flange 20 includes a plate portion 38 which extends radially from an inner or body portion 39 of the flange 20. A ring shaped portion 40 is suitably joined to the face of the plate portion 38 at its outer edge. The return transmission plate 14 is suitably joined to the face of the ring shaped portion 40 and extends radially inwardly of the ring shaped portion 40 between the strips 18 and the plates 34 to a position spaced from the body portion 36 of the supply flange 22. An annular radially extending plate 42 is suitably joined to the inner surface of the ring shaped portion 40 and extends between and in spaced relation to the plates 34. The inner edge of the plate 42 is spaced from the body portion 36 of the supply flange 22. Suitable insulation (not shown) is disposed between the flanges 20 and 22.

Because of the large, effective radius of the flange, there is a negligible transverse field created in the plasma region by the re-distributon of the image currents until these currents have reached the most remote region of the supply flange 22. At this point, the currents are re-distributed and pass through the trimmed inductance strips 18 without upsetting the inductive voltage of the strips 18.

Other means, while less desirable, may be employed to redistribute the plasma image current, such as specially machined or flared flanges. More specifically, grooves may be cut in the face of the supply flange to make the permeability of the gap anisotropic. In the flared flange, the spacing between adjacent flanges (gap spacing) is made a continuous function of the radius.

As shown in FIGURE 4, each of the tubular segments 10 is provided with a longitudinal slot 44 to prevent current from flowing circumferentially around the segment 10. When the current is passed longitudinally through the segment 10 and when the circumferential stabilizing field is present they set up a magnetizing flux which leaks through this longitudinal slot 44 in the segment 10. To reduce the leakage of flux through this slot 44, a flap 46 is suitably joined to the upper edge of the slot 44. The flap 46 is extended downwardly beyond the lower wall of the slot 44. The flap 46 is received in a trough 48 suitably joined to the segment 10 below the slot 44 therein.

The above described toroidal fusion research device has substantially a uniform magnetic field throughout the length of the containment vessel. In this connection, transverse fields at the gaps between flanges is minimized. In one embodiment, the transverse field is less than 0.5 percent of the maximum field at the wall of the containment vessel and magnetic lines of force wander only .6 mm. in passing around the tube.

Various changes and modifications may be made in the above described fusion research apparatus without deviating from the spirit and scope of the present invention.

What is claimed is:

1. In a fusion research apparatus, a non-linear tubular containment vessel, a plurality of generally tubular conductors extending about and sequentially disposed in spaced relation along said containment vessel, current supply connections, ground connections, a plurality of return transmission plates coupling said ground connections to corresponding ends of the conductors, one each of said return transmission plates being connected to one of said tubular conductors, a plurality of transmission means coupling said current supply connections to the other ends of said tubular conductors, each of said transmission means including a plurality of spaced, conductive strips extending from said supply connection to the associated tubular conductor, said conductive strips being connected to separate areas along the periphery of the associated other end of the tubular conductor, the size and spacing of the conductive strips being such that the inductances thereof distribute the current to the tubular conductor in accordance with the current required at the separate areas of the tubular conductor to minimize transverse fields at spaces between the tubular conductors, means for producing an axial, stabilizing field in said vessel, and a conducting shield disposed about said tubular conductors, said transmission plates and said tranmission means.

2. In a fusion research apparatus, a toroidal tubular containment vessel, a plurality of generally tubular conductors extending about and sequentially disposed in spaced relation along said containment vessel, current supply connections, ground connections, a plurality of return transmisison plates coupling said ground connections to corresponding ends of the conductors, one each of said return transmission plates being connected to one of said tubular conductors, a plurality of transmission means coupling said current supply connections to the other ends of said tubular conductors, each of said transmission means including a plurality of vertically spaced, conductive strips extending generally parallel to the adjacent return transmission plate from said supply connection to the associated tubular conductor, said conductive strips being connected to separate areas along the periphery of the associated other end of the tubular conductor, the size and spacing of the conductive strips being such that the inductances thereof distribute the current to the tubular conductor in accordance with the current required at the separate areas of the tubular conductor to minimize transverse fields at the spaces between the tubular conductors, means for producing an axial, stabilizing field in said vessel, and a conducting shield disposed about said tubular conductors, said transmission plates, and said transmission means.

3. In a fustion research apparatus, a toroidal tubular containment vessel, a plurality of generally tubular conductors extending about and sequentially disposed in spaced relation along said containment vessel, current supply connections disposed away from the major axis of the vessel, ground connections disposed away from the major axis of the vessel, a plurality of return transmission plates coupling said ground connections to corresponding ends of the conductors, one each of said return transmission plates being connected to one of said tubular conductors, and a plurality of transmission means coupling said current supply connections to the other ends of said tubular conductors, each of said transmission means including a plurality of spaced, conductive strips extending from said supply connection to the associated tubular conductor, said conductive strips being connected to separate areas along the periphery of the associated other end of the tubular conductor, the size and spacing of the conductive strips being such that the inductances thereof distribute the current to the tubular conductor in accordance with the current required at the separate areas of the tubular conductor to minimize transverse fields at the spaces between the tubular conductors, means for producing an axial, stabilizing field in said vessel, and a conducting shield disposed about said tubular conductors, said transmission plates, and said transmission means.

4. In a fusion research apparatus, a non-linear tubular containment vessel, a plurality of generally tubular conductors extending about and sequentially disposed in spaced relation along said containment vessel, current supply connections, ground connections, the opposed ends of adjacent conductors being provided with opposed flanges, a plurality of return transmission plates coupling said ground connections to corresponding flanges, one each of said return transmission plates being connected to one of said flanges, a plurality of transmission means coupling said current supply connections to the other flanges, each of said transmission means including a plurality of spaced, conductive strips extending from said supply connection to the flange of the associated tubular conductor, said conductive strips being connected to separate areas along the periphery of the flange, the size and spacing of the conductive strips being such that the inductances thereof distribute the current to the tubular conductor in accordance with the current required at the separate areas of the tubular conductor to minimize transverse fields at the spaces between the tubular conductors, the flanges connected to said strips being doubly folded to provide flanges with relatively large effective radii, means for producing an axial, stabilizing field in said vessel, and a conducting shield disposed about said tubular conductors, said transmission plates, and said transmission means.

5. In a fusion research apparatus, a non-linear tubular containment vessel, a plurality of generally tubular conductors extending about and sequentially disposed in spaced relation along said containment vessel, current supply connections, ground connections, a plurality of return transmission plates coupling said ground connections to corresponding ends of the conductors, one each of said transmission plates being connected to one of said tubular conductors, a plurality of supply transmission means coupling said current supply connections to the other ends of the conductors, each of said means including a plurality of spaced conductive strips connected to separate areas along the periphery of the conductors, said strips being sized and spaced so that the inductances thereof distribute the current to the conductor in accordance with the current required at the separate areas to minimize transverse fields at the spaces between the tubular conductors, the opposed ends of adjacent tubular conductors being provided with opposed flanges, one of said flanges having a pair of annular recesses, the opposed flange including a pair of inward and radially extending plates which are disposed in said recesses in spaced relation to the walls of said recesses, the return transmision plate being connected to said one flange at the face thereof, the supply transmission plate being connected to the opposed flange at the rearward side thereof, means for producing an axial, stabilizing field in said vessel, and a conducting shield disposed about said tubular conductors, said transmission plates, and said transmission means.

6. In a fusion research apparatus, a toroidal tubular containment vessel, a plurality of toroidal generally tubular conductors extending about and sequentially disposed in spaced relation along said containment vessel, each of said conductors being provided with a longitudinal slot, a flap extending from one edge of said slot to a point beyond the other edge of said slot, a trough at the other edge for receiving said flap, current supply connections, ground connections, the opposed ends of adjacent conductors being provided with opposed flanges, a plurality of return transmission plates coupling said ground connections to corresponding flanges, one each of said return transmission plates being connected to one of said tubular conductors, a plurality of transmission means coupling said current supply connections to the other flanges, each of said transmission means including a plurality of spaced conductive strips extending from said supply connection to the flange of the associated tubular conductor, said conductive strips being connected to separate areas along the periphery of the flange, the size and spacing of the conductive strips being such that the inductances thereof distribute the current to the tubular conductor in accordance with the current required at the separate areas of the tubular conductor to minimize transverse fields at the spaces between the tubular conductors, the flanges connected to said strips being doubly folded to provide a flange with a relatively large effective radius, means for producing an axial, stabilizing field in said vessel, and a conducting shield disposed about said tubular conductors, said transmission plates, and said transmission means.

7. In a fusion research apparatus, a toroidal tubular containment vessel, a plurality of toroidal generally tubular conductors extending about and sequentially disposed in spaced relation along said containment vessel, each of said conductors being provided with a longitudinal slot, a flap extending from one edge of said slot to a point beyond the other edge of said slot, a trough at the other edge for receiving said flap, current supply connections, ground connections, the opposed ends of adjacent conductors being provided with opposed flanges, a plurality of return transmission plates coupling said ground connections to corresponding flanges, one each of said return transmission plates being connected to one of said tubular conductors, a plurality of transmission means coupling said current supply connections to the other flanges, each of said transmission means including a plurality of spaced conductive strips extending from said supply connection to the flange of the associated tubular conductor, said conductive strips being connected to separate areas along the periphery of the flange, the size and spacing of the conductive strips being such that the inductances thereof distribute the current to the tubular conductor in accordance with the current required at the separate areas of the tubular conductor to minimize transverse fields at the spaces between the tubular conductors, one of said opposed flanges having a pair of annular recesses, the other opposed flange including a pair of inward and radially extending plates which are disposed in said recesses in spaced relation to the walls of said recesses, the return transmission plate being connected to said one opposed flange at the face thereof, the supply transmission plate being connected to the other opposed flange at the rearward side thereof, means for producing an axial, stabilizing field in said vessel, and a conducting shield disposed about said tubular conductors, said transmission plates, and said transmission means.

References Cited by the Examiner

UNITED STATES PATENTS

| | | | |
|---|---|---|---|
| 2,976,444 | 3/1961 | Kerst et al. | 313—62 |
| 2,991,238 | 7/1961 | Phillips et al. | 176—3 |
| 2,993,851 | 7/1961 | Thomson et al. | 176—3 |

REUBEN EPSTEIN, *Primary Examiner.*

CARL D. QUARFORTH, *Examiner.*